(12) United States Patent
Karafin et al.

(10) Patent No.: US 11,166,007 B2
(45) Date of Patent: *Nov. 2, 2021

(54) MULTISCOPIC IMAGE CAPTURE SYSTEM

(71) Applicant: LIGHT FIELD LAB, INC., San Jose, CA (US)

(72) Inventors: Jonathan Sean Karafin, Morgan Hill, CA (US); Miller H. Schuck, Erie, CO (US); Douglas J. McKnight, Boulder, CO (US); Mrityunjay Kumar, Ventura, CA (US); Wilhelm Taylor, Boulder, CO (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,236

(22) Filed: Jun. 26, 2018

(65) Prior Publication Data

US 2018/0376132 A1 Dec. 27, 2018

Related U.S. Application Data

(63) Continuation of application No. 15/418,637, filed on Jan. 27, 2017, now Pat. No. 10,009,597, which is a continuation of application No. PCT/US2015/000118, filed on Sep. 29, 2015.

(60) Provisional application No. 62/056,366, filed on Sep. 26, 2014.

(51) Int. Cl.
*H04N 13/282* (2018.01)
*H04N 13/111* (2018.01)
*H04N 13/204* (2018.01)
*H04N 13/00* (2018.01)

(52) U.S. Cl.
CPC ......... *H04N 13/282* (2018.05); *H04N 13/111* (2018.05); *H04N 13/204* (2018.05); *H04N 2013/0081* (2013.01); *H04N 2213/001* (2013.01)

(58) Field of Classification Search
CPC .. H04N 13/282; H04N 13/204; H04N 13/111; H04N 2013/0081; H04N 2213/001
See application file for complete search history.

(56) References Cited

U.S. PATENT DOCUMENTS

| | | | |
|---|---|---|---|
| 10,009,597 B2 * | 6/2018 | Karafin | H04N 13/204 |
| 2002/0122113 A1 * | 9/2002 | Foote | G06T 3/4038 348/48 |
| 2004/0247159 A1 | 12/2004 | Damera-Venkata et al. | |
| 2008/0049100 A1 | 2/2008 | Lipton et al. | |

(Continued)

FOREIGN PATENT DOCUMENTS

WO 2014122012 A1 8/2014

OTHER PUBLICATIONS

PCT/US2015/000118 International search report and written opinion of the international searching authority dated Apr. 19, 2016.

*Primary Examiner* — Timothy J Henn
(74) *Attorney, Agent, or Firm* — Charles C. Yang

(57) ABSTRACT

Systems, devices, and methods disclosed herein may generate captured views and a plurality of intermediate views within a pixel disparity range, $T_d$, the plurality of intermediate views being extrapolated from the captured views.

18 Claims, 12 Drawing Sheets

(56) References Cited

U.S. PATENT DOCUMENTS

| | | | |
|---|---|---|---|
| 2008/0174670 A1* | 7/2008 | Olsen | H01L 27/14645 348/222.1 |
| 2011/0069189 A1* | 3/2011 | Venkataraman | H01L 27/14618 348/218.1 |
| 2011/0069237 A1 | 3/2011 | Wang et al. | |
| 2012/0147205 A1* | 6/2012 | Lelescu | G06T 3/4076 348/218.1 |
| 2013/0016097 A1 | 1/2013 | Coene et al. | |
| 2013/0250150 A1* | 9/2013 | Malone | G02B 15/00 348/262 |
| 2014/0078333 A1* | 3/2014 | Miao | H04N 5/23212 348/222.1 |
| 2015/0146029 A1* | 5/2015 | Venkataraman | G06T 3/4053 348/218.1 |
| 2015/0146030 A1* | 5/2015 | Venkataraman | H04N 5/2258 348/218.1 |
| 2015/0294472 A1* | 10/2015 | Putraya | G06T 7/557 382/154 |
| 2016/0105660 A1* | 4/2016 | Ito | G06T 7/97 348/46 |
| 2019/0364263 A1* | 11/2019 | Jannard | H04N 5/247 |

* cited by examiner

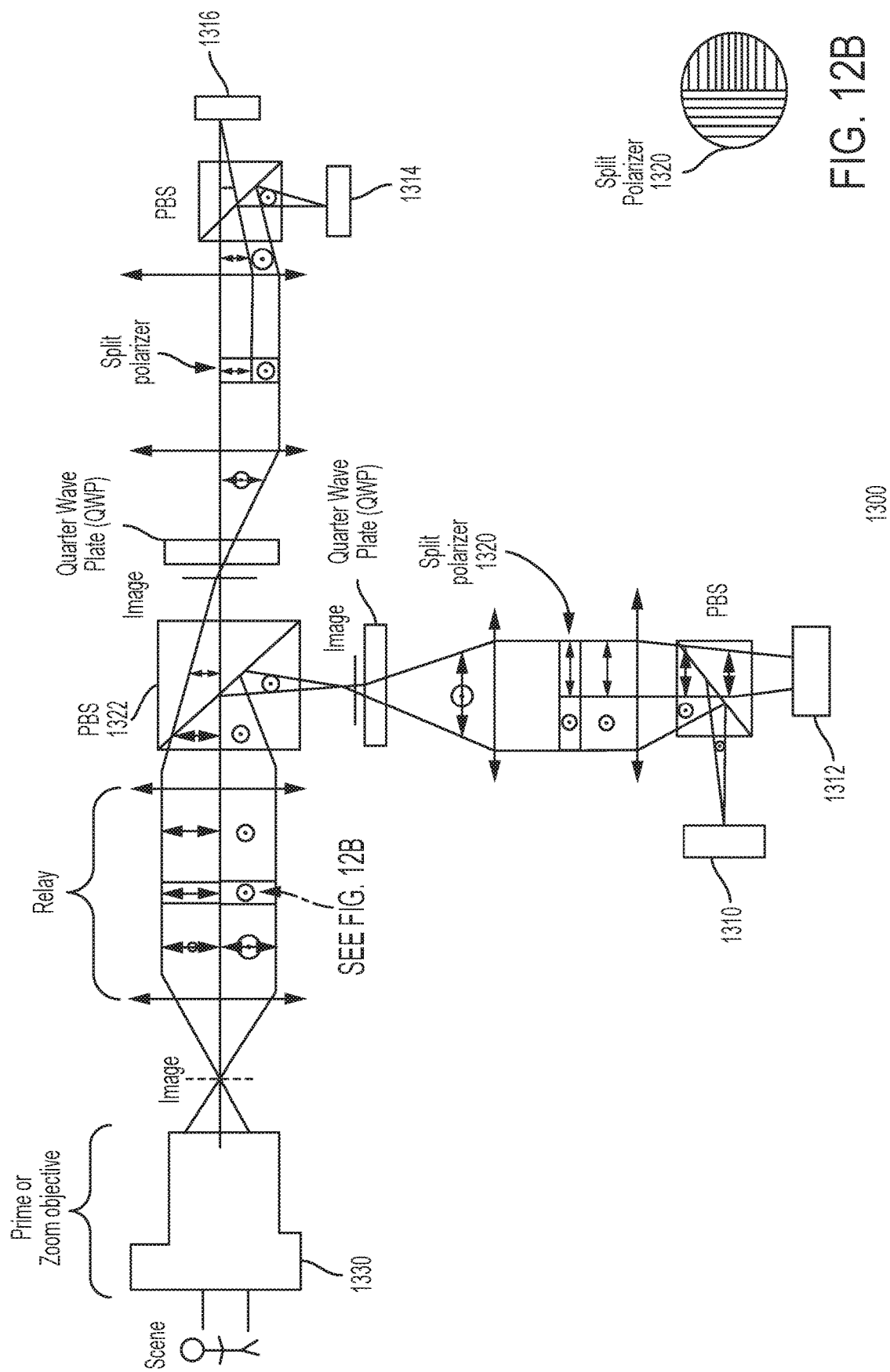

MULTISCOPIC IMAGE CAPTURE SYSTEM

TECHNICAL FIELD

The present disclosure generally relates to imaging capture systems, and more particularly to image capture systems configured to generate a plurality of captured views of the same scene or object.

BACKGROUND

Images capture system may be configured to provide a plurality of captured views of the same scene or object. Intermediate views may be interpolated from the plurality of captured views. The interpolated intermediate views may be used to generate multiscopic content, including stereoscopic, panoramic (e.g., 180-, 270-, 360-degree views), and holographic contents.

SUMMARY

An exemplary embodiment of a capture system may be operable to generate captured views and a plurality of intermediate views within a pixel disparity range, Td, the plurality of intermediate views being extrapolated from the captured views. The system may include S number of sensors operable to generate the captured views, S being an integer greater than one, wherein each sensor pairs with at least one other sensor to define a maximum effective disparity Md. In an embodiment, S is greater than or equal to (Td/Md)+1 wherein the ratio Td/Md is greater than 1. At least two of the S number of sensors may be defined on different substrates. The sensors have an effective sensor width, Sw and an effective pixel resolution. Px and the sensors have optical centers separated by a distance, DIA, which is (SW*DMax*MD)/(PX*FL), Dmax being the distance between the sensor imaging plane and the closest object in a scene, and Fl being the focal length.

In an embodiment, Md is less than 25% of a pixel resolution of a first intermediate view. In an embodiment, Md is less than 10% of the pixel resolution of the first intermediate view. In an embodiment, Md is less than 1% of the pixel resolution of the first intermediate view.

In an embodiment, the image capture system may further include optical modules having lenses operable to direct image light towards the sensors, the lenses each define an effective focal length, Fl, wherein optical centers of adjacent optical modules are spaced apart by a maximum inter axial distance, Dia, or less, the Dia being defined by the equation: Dia=(Ws*DMax*MD)/(PX*FL), wherein DMax is a distance between a closest capture object and the optical center of a nearest optical module.

The sensors may be arranged in a variety of arrangement, including a vertical array, horizontal array, or a 2 dimensional array.

In an embodiment, the sensors each have a sensor width, Ws, defined along a first direction, have a pixel resolution, Px, along the first direction, and are disposed in optical modules and the capture system further include optical modules comprising lenses operable to direct image light towards the sensors, the lenses each define an effective focal length, Fl, and optical centers of adjacent optical modules are spaced apart by a maximum inter axial distance, Dia, or less, the Dia being defined by the equation: Dia=(Ws*DMax*MD)/(PX*FL), wherein DMax is a distance between a closest capture object and the optical center of a nearest optical module.

An exemplary embodiment of a capture system comprises: 1) a first cluster of sensors operable to generate first captured views, the first cluster comprising S1 number of sensors, S1 being an integer greater than one, wherein a first plurality of intermediate views within a first pixel disparity range, Td1, are operable to be extrapolated from the first captured views; and 2) a second cluster of sensors operable to generate the second captured views, the second cluster comprising S2 number of sensors, S2 being an integer greater than one, wherein a second plurality of intermediate views within a second pixel disparity range, Td2, are operable to be extrapolated from the second captured views. Each sensor of the first cluster pairs with at least one other sensor to define a maximum effective disparity, Md1, of the first cluster. Each sensor of the second cluster pair with at least one other sensor to define a maximum effective disparity, Md2, of the second cluster. In an embodiment, S1≥(Td1/Md1)+1 and S2≥(Td2/Md2)+1, and the ratios Td1/Md1 and Td2/Md2 both greater than 1. At least one of the first cluster of sensors and at least one of the second cluster of sensors may be defined on different substrates.

In an embodiment, the first cluster of sensors comprise at least two sensors defined on a same substrate. In an embodiment, the at least two sensors on the same substrate are operable to capture different views. In another embodiment, the first cluster of sensors comprise at least two sensors defined on different substrates.

In an embodiment, at least one of the first or the second cluster of sensors comprise at least two sensors having substantially the same pixel pitch.

An exemplary capture system is operable to generate captured views, and a plurality of intermediate views within a pixel disparity range, Td, are operable to be extrapolated from the captured views. The capture system may include S number of sensors operable to generate the captured views, S being an integer greater than one, wherein each sensor pairs with at least one other sensor to define a maximum effective disparity (matched to effective resolution), Md, and wherein S≥(Td/Md)+1 and the ratio Td/Md is greater than 1.

In an embodiment, the Md is less than 25% of a pixel resolution of a first intermediate view; and at least two of the S number of sensors are defined on different substrates. In an embodiment, Md is less than 10% of the pixel resolution of the first intermediate view. In an embodiment, Md is less than 1% of the pixel resolution of the first intermediate view.

BRIEF DESCRIPTION OF THE DRAWINGS

Embodiments are illustrated by way of example in the accompanying figures, in which like reference numbers indicate similar parts, and in which:

FIG. 12A is a schematic diagram illustrating a capture system with split aperture configuration, in accordance with the present disclosure.

FIG. 12B is a schematic diagram illustrating an embodiment of a split polarizer.

DETAILED DESCRIPTION

Figure 1:
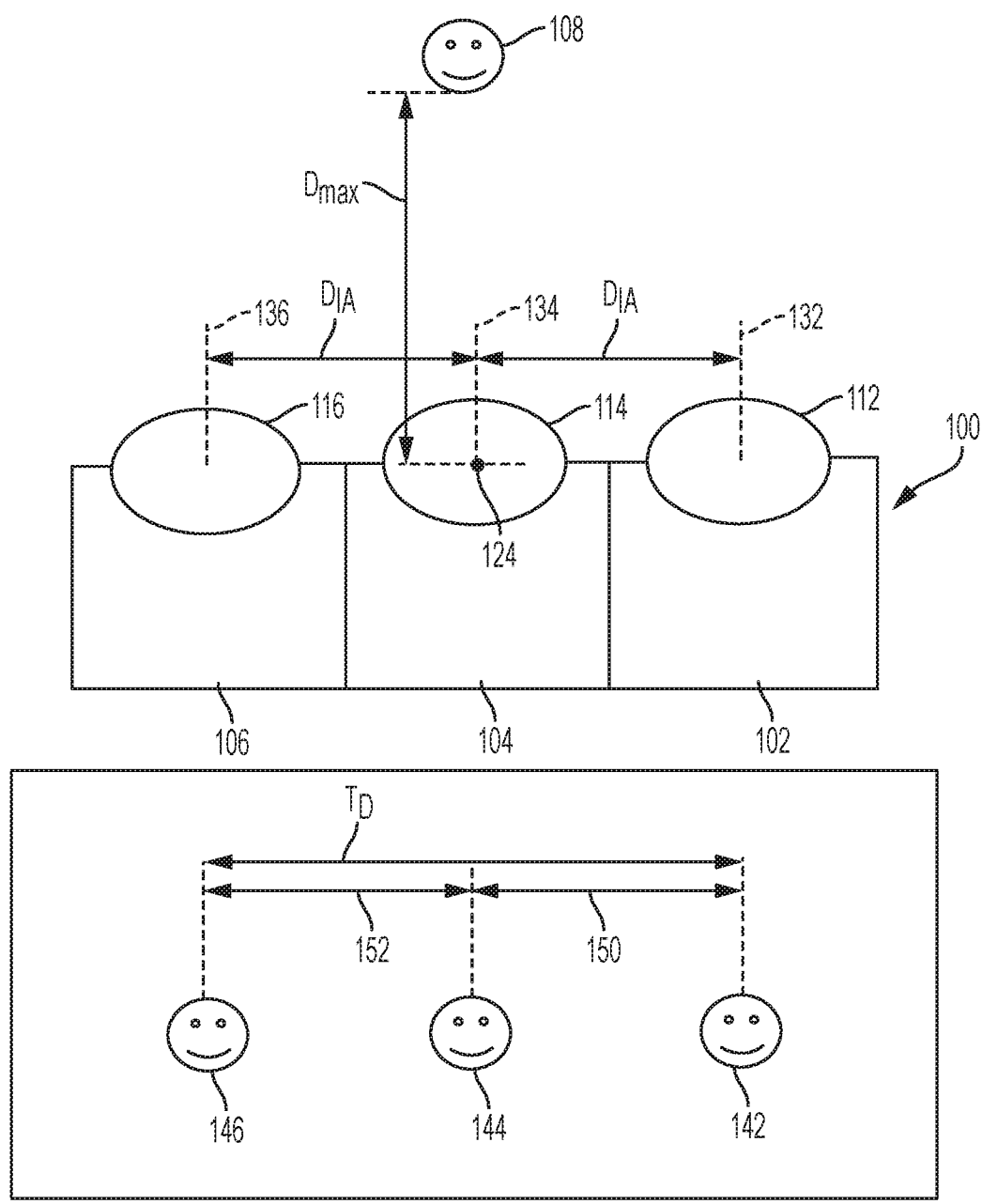
FIGS. 1 and 2 are schematic diagrams illustrating a first capture system operable to capture different views of an object.
Figure 2:
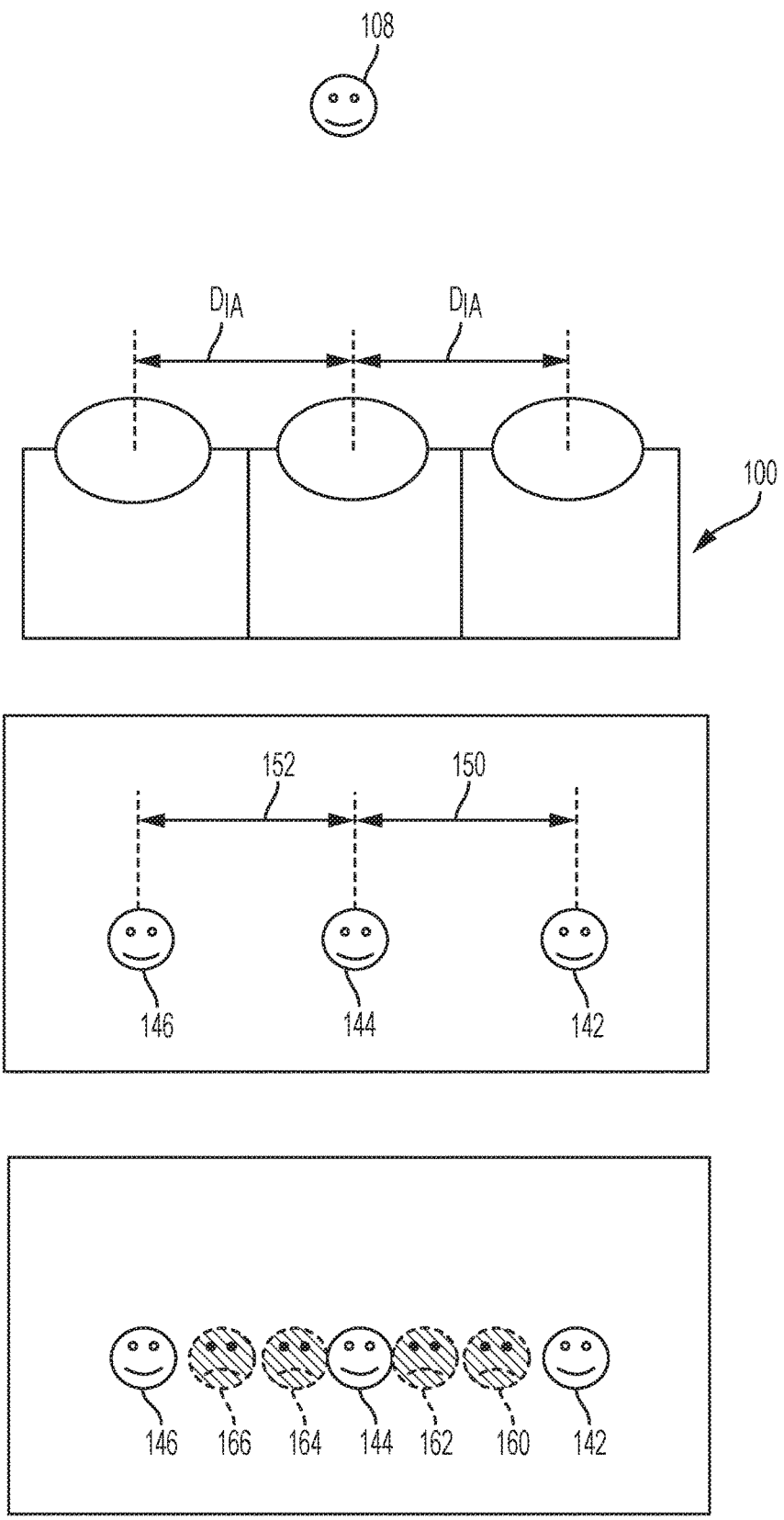

FIGS. 1 and 2 are schematic diagrams illustrating a capture system 100 configured to generate a plurality of captured views of an objection. The capture system 100 may include a number, N, of optical modules 102, 104, 106 configured to capture a scene comprising a closest object 108. While FIG. 1, for illustrative purpose, shows only three optical modules 102, 104, 106, it is to be appreciated that the capture system 100 may include other numbers of optical modules, such as, two, four, five or more. The optical modules 102, 104, and 106 have optical axes 132, 134, and 136, respectively, and the optical axes 132, 134, and 136 are spaced apart by an interaxial distance, $D_{IA}$. The closest object 108 may be spaced from an optical center 124 of the optical module 104 by a distance $D_{max}$, which is parallel to the optical axis 134 of the optical module 104. The optical modules 102, 104, and 106 are configured to generate the captured views 142, 144, and 146 of the object 108, respectively. The captured views 142, 144 may have a disparity 150, and the captured view 144, 146 may have a disparity 152. The disparity between the first and last captured views 142 and 146 define a total disparity range $T_D$. In an embodiment, the optical modules 102, 104, and 106 may have form factors that result in a large $D_{IA}$, such as a lens diameter on the order of 10 cm, and the large $D_{IA}$, in turn, may result in large disparities 150 and 152. As illustrated in FIG. 2, with large disparities 150 and 152, the captured views 142, 144, and 146 do not provide enough information to interpolate intermediate views (e.g., 160, 162, 164, 166) within the total disparity range without creating occlusions and substantial distortions.

Figure 3:
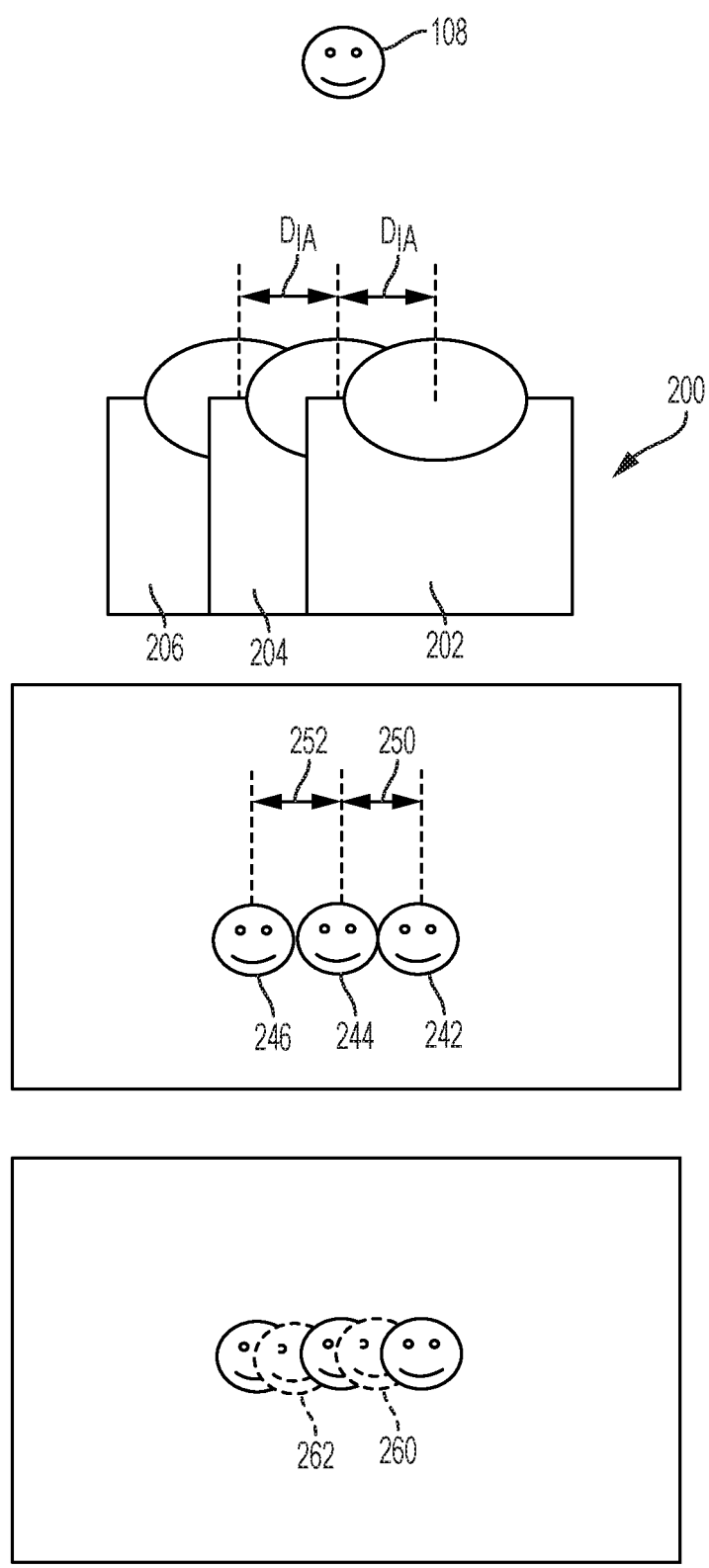
FIG. 3 is a schematic diagram illustrating a theoretical capture system operable to capture different views of an object.

FIG. 3 is a schematic diagram showing a theoretical capture system 200 similar to that of capture system 100 except the form factor limitations (e.g., lens diameter) are ignored. The capture system 200 may include theoretical optical modules 202, 204, 206 that are superimposed on each other to reduce the $D_{IA}$ and thereby reducing the disparities 250 and 252 of the captured views 242, 244, and 246. The disparities 250 and 252 may be less than a maximum effective disparity, $M_D$, such that intermediate views 260 and 262 may be generated substantially seamlessly without creating occlusions and distortions.

While the $M_D$ in FIG. 3 was achieved by superimposing the optical modules 202, 204, 206, which is physically impossible, it is to be appreciated that, in accordance with the principles disclosed in the present disclosure, various hardware configurations of the capture systems of the present disclosure may be configured to allow for capture views with a $M_D$ such that intermediate views within a total disparity range. $T_D$, may be generated substantially seamlessly without creating occlusions and distortions.

Figure 4:
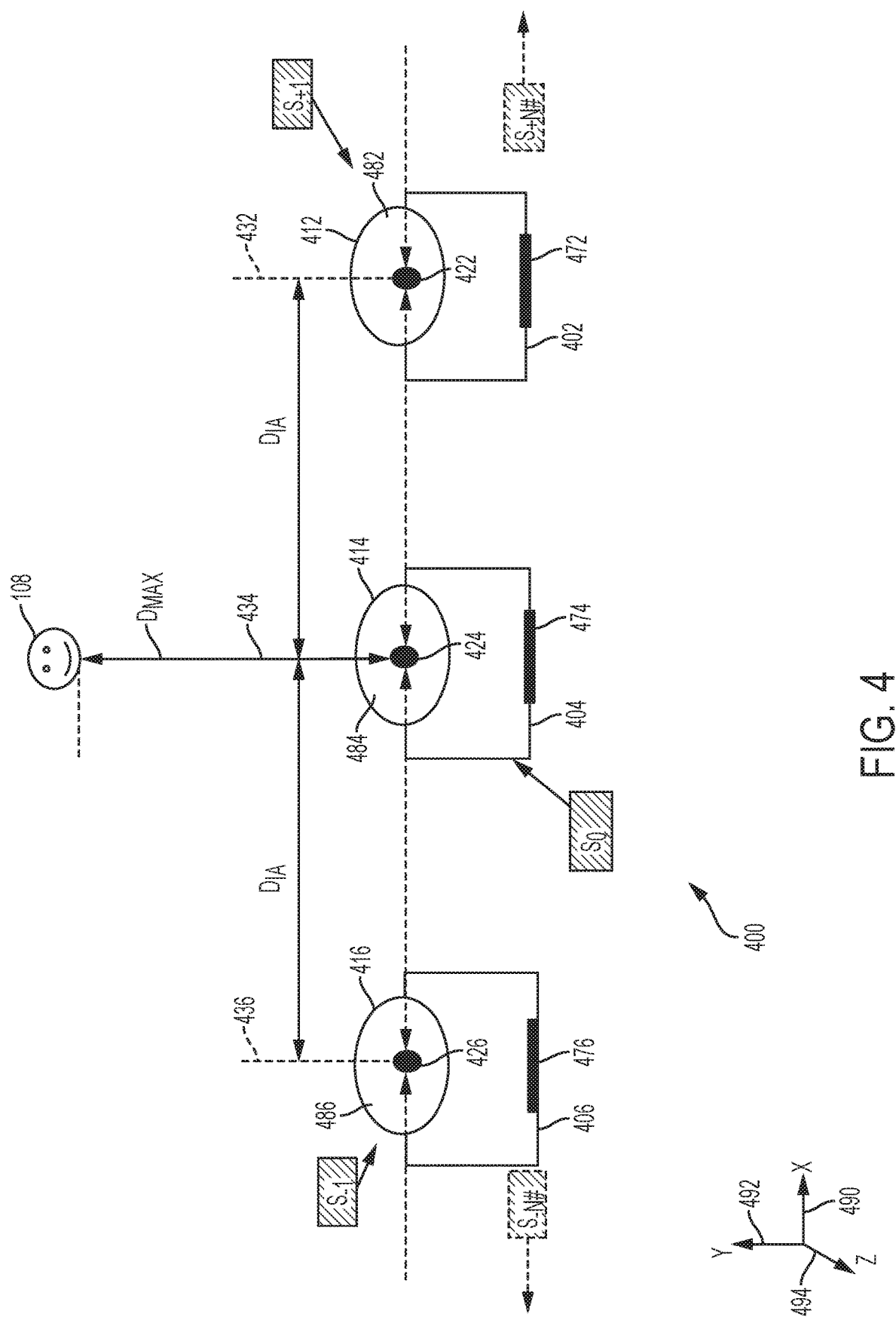
FIG. 4 is a schematic diagram illustrating a capture system operable to capture different views of an object and interpolate from the capture views, in accordance with the present disclosure.

FIG. 4 is a schematic diagram illustrating an exemplary embodiment of a capture system 400 in accordance with the present disclosure. The capture system 400 may be configured to generate captured views of a scene. The scene information in the capture views generated by the capture system 400 allows for, generating, without substantial artifacts, at least one intermediate view within a pixel disparity range, $T_D$, defined by the captured views. $T_D$ may be user defined, automatically calculated, or predefined.

In an embodiment, the capture system 400 may include at least S number of optical modules, such as optical modules 402, 404, and 406. While only optical modules 402, 404, and 406 are shown in FIG. 4 for illustrative purpose, it is to be appreciated that the capture system 400 may include other numbers of optical modules, such as, two, four, five or more. In an embodiment, each of the optical modules 402, 404, 406 may include at least one imaging sensor 472, 474, 476, respectively, and at least one lens 482, 484, 486, respectively, configured to direct image light to the imaging sensors 472, 474, 476 to generate captured views, thereby defining an effective focal length, $F_L$. In an embodiment, at least two of the imaging sensors 472, 474, 476 are defined on different substrates.

The capture system 400 may be configured so that the number S is greater than or equal to $(T_D/M_D)+1$, in which S may be a number rounded up to the nearest integer. The ratio $T_D/M_D$ may be greater than 1. The imaging sensors 472, 474, 476 may pair with an adjacent imaging sensor to define a maximum effective disparity $M_D$, which may be less than or equal to $(D_{IA}*P_X*F_L)/(S_w*D_{MAX})$, in which:

$S_w$ is an effective sensor width of the image sensors 472, 474, 476, the $S_w$ being defined along a first direction 490;

$P_X$ is an effective pixel resolution of the image sensors 472, 474, 476 along the first direction 490;

$D_{IA}$ is an interaxial distance between optical centers 422, 424, 426 of adjacent optical modules 402, 404, 406; and $D_{MAX}$ is a distance between the closest object 108 in the scene and the optical center 424 of the optical module 404 closest to the closest object 108.

In an embodiment, the image sensors 472, 474, 476 may have pixels that are not active for any reason, such as digital scaling, and the effective sensor width, $S_w$, and the effective pixel resolution, $P_X$, of the image sensors 472, 474, 476 may be understood to be defined by the active pixels only.

It is to be appreciated from that $M_D$ allows for the determination of the S number of sensors in the capture system 400 to allow for the interpolation of intermediate views from the capture views within the $T_D$ substantially without artifacts. Additionally, various physical configurations of the capture system 400 may be adjusted to achieve a combination of $D_{IA}$, $P_X$, $F_L$, and $S_w$ to achieve $M_D$, thereby allowing for the interpolation of intermediate views from the capture views within the $T_D$ substantially without artifacts. In an embodiment, to allow for the interpolation of intermediate views from the capture views within the $T_D$ substantially without artifacts, $M_D$ maybe less than a percentage of a pixel resolution of a first intermediate view. For an intermediate view having a pixel resolution of at least 1K in one dimension, the percentage may be about 25%, or preferably about 10%, or most preferably about 1%.

The first direction 490 along which the effective pixel resolution is defined may be referred to as the x-direction, and a second direction 492 orthogonal to the first direction 490 may be referred to as the y-direction. In this geometry, the optical centers 422, 424, 426 may be fixed in both the x- and y-directions and define an array of the optical modules 402, 404, and 406. In an embodiment, the modules 402, 404, and 406 may have optical axes 432, 434, 436, respectively, extending along a third direction 494 referred to as the z-direction, which is orthogonal to the x- and y-directions and perpendicular to the surface of imaging sensors 472, 474, 476, respectively.

In an embodiment, the surfaces of the imaging sensors 472, 474, 476 may be configured to be parallel to each other. For reasons to be discussed below in greater detail, in an embodiment, the imaging sensors 472, 474, 476 may be configured to translate along the x-, y-, or z-direction. In an embodiment, the lens 482, 484, 486 may be rotatable about the x-, y-, or z-direction, resulting in 3 degrees of freedom plus focal adjustment.

In an embodiment, the lens of capture system 400 may have a maximum optical distortion of <OMax %, in which the OMax may be a maximum distortion value to ensure rectilinear or near rectilinear image acquisition. OMax may be user defined, automatically calculated, or predefined. The lens may also have a maximum focal length differential of <TMax %, in which TMax may be a maximum differential value between the lenses' field of view as captured during image acquisition such that the optical characteristics between each individual module are corrected for optomechanically within the below established tolerances. TMax may be user defined, automatically calculated, or predefined. The resulting captured image, given the above tolerances, may be individually calibrated (if necessary) through use of calibration targets (or similar) to include individual optical distortion correction displacement maps per module to ensure rectilinear image output. Images may be calibrated both optomechanically and/or through hardware and/or software image processing to ensure all capture perspective images contain the lowest possible distortion and variance. In an embodiment, the captured pixels may be aligned, before and/or after image processing calibration, within a tolerance of +/−TMax % (represented as a percent of pixel width of frame) at the corners of each frame at a distance greater than $D_{Inf}$ about the X image axis. $D_{Inf}$ may be the distance where less than 1 pixel of disparity is possible between any two adjacent optical modules and may be calculated as $(F_L*D_{IA}*P_X)/S_W$.

Figure 5:
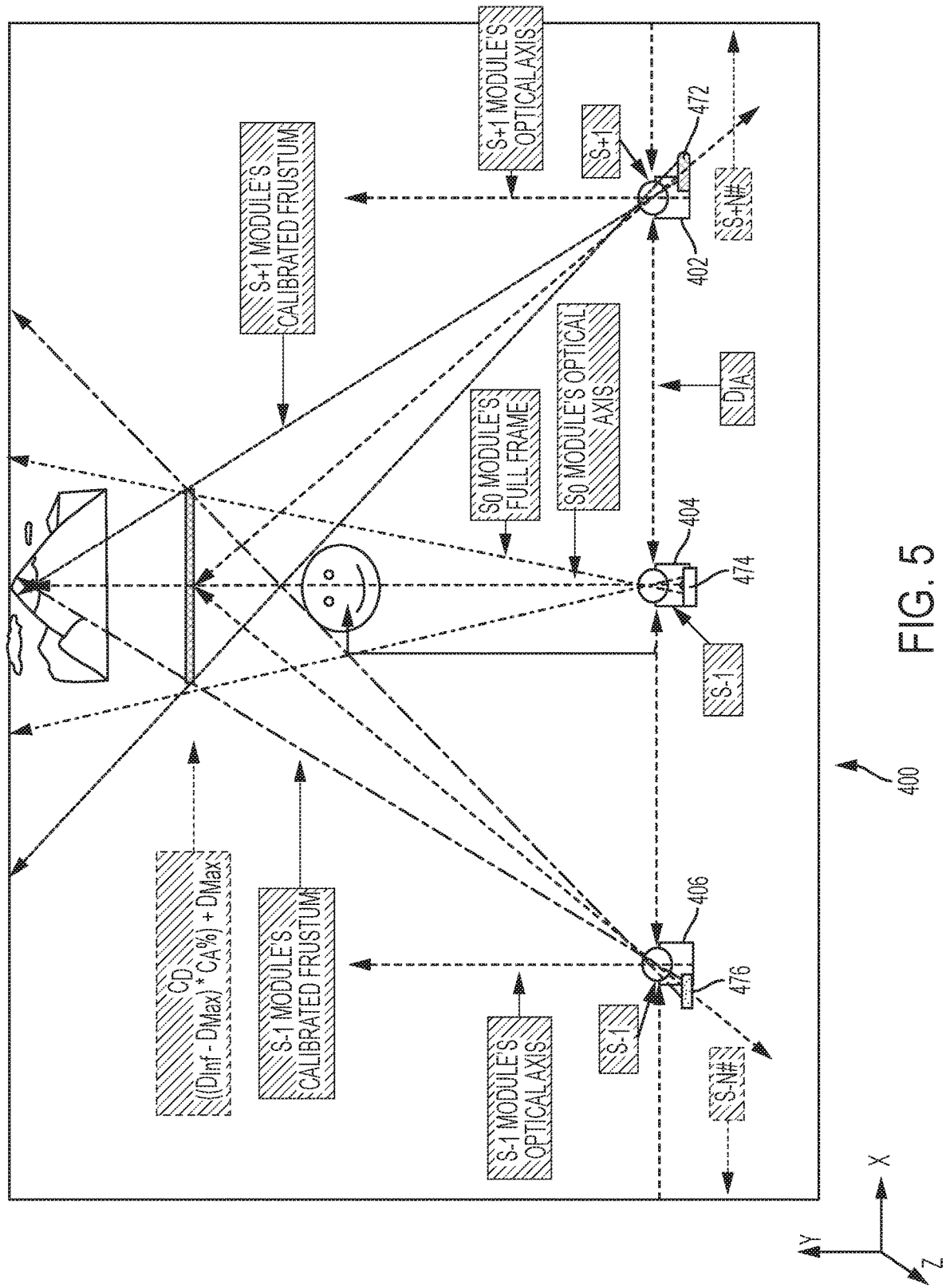
FIG. 5 is a schematic diagram illustrating an exemplary capture system operable to capture different views of an object, in accordance with the present disclosure.

The captured pixels may be aligned within a tolerance of +/−(TMax/TC) % (represented as a percent of pixel width of frame) at the center of each frame at a distance greater than $D_{Inf}$ before and/or after image processing calibration, within a tolerance of +/−TYMax % (represented as a percent of pixel width of frame) at the corners of each frame at a distance greater than $D_{Inf}$ about the Y image axis, in which: TMax %=PMax/$P_X$; TYMax %=TMax %*($P_Y/P_X$). $P_Y$ may be the effective pixel resolution along Y axis produced by imaging sensor. PMax may be a number of pixels, and TC may be a threshold divisor Referring now to FIGS. 5 and 6, which schematically illustrate the calibration of the capture system 400 for converged capturing, which allows interpolated intermediate views for panoramic (e.g., 180-, 270-, 360-degree views), and holographic contents. The image sensors 472, 474, 476 of the capture system 400 may be translated by a distance DS in the x-direction to an offset position relative to the respective optical axes 432, 434, 436, to converge the images captured by all perspectives at the image frustum height and width at a perpendicular distance, CD, from each of the imaging sensors 472, 474, 476. CD may be determined by the equation CD=(($D_{Inf}-D_{Max}$)*CA %)+DMax, in which CA % is a percent between 0 and 100% to determine a relative position between the nearest and furthest captured positions within a disparity space. The disparity space may refer to the world positions that exist between the distances that are parallel to optical axis and perpendicular to imaging sensor's surface from optical center of any individual optical module of disparity space values 1 through MD. In an embodiment, the image sensors 472, 474, 476 of the capture system 400 may be translated by a distance DS in the y-direction or z-direction. DS may be determined by the equation. DS=(($S_{N\#}*D_{IA}$)/CD)*$F_L$.

Figure 6:
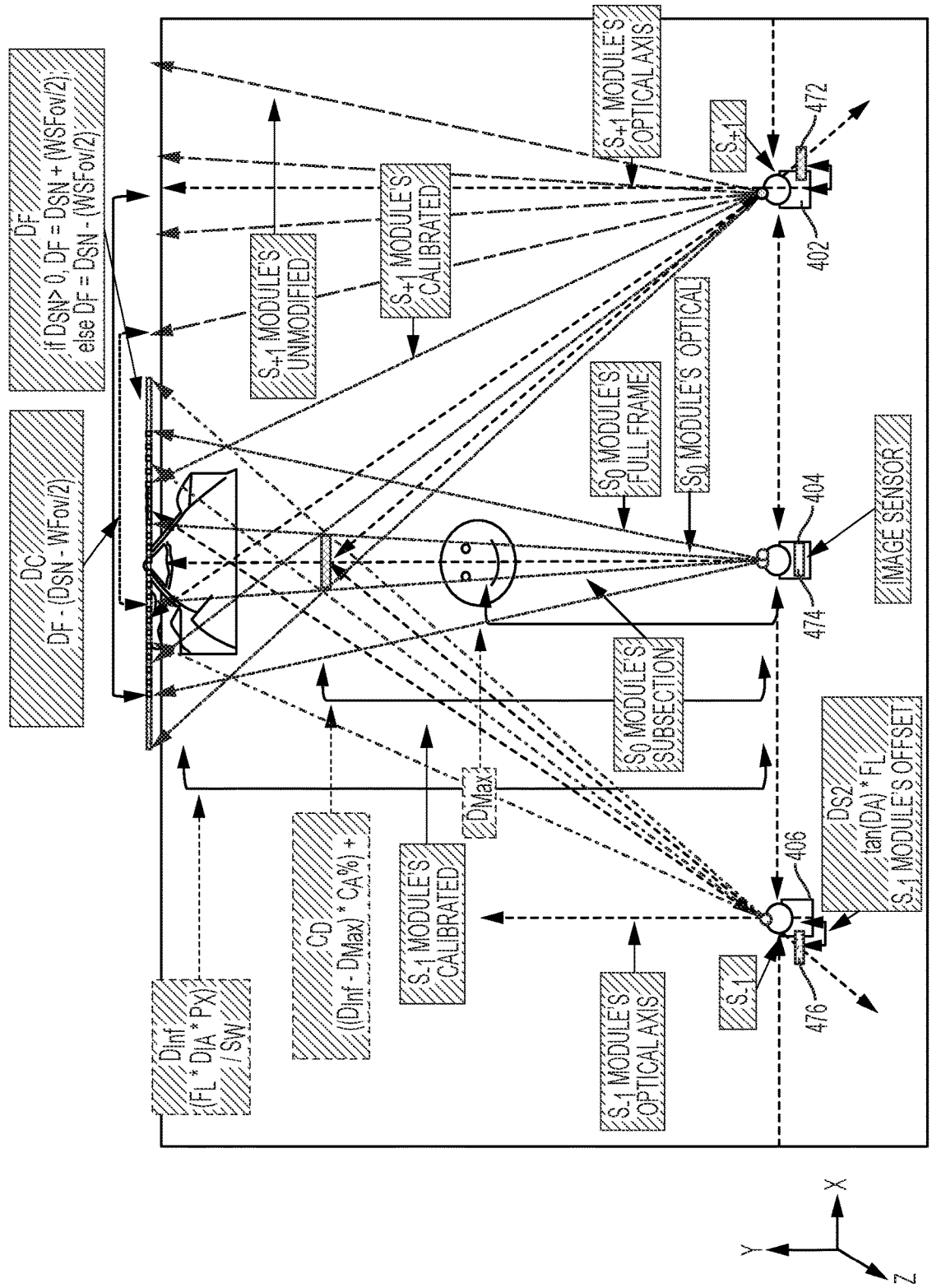
FIG. 6 is a schematic diagram illustrating another exemplary capture system operable to capture different views of an object, in accordance with the present disclosure.

In an embodiment as illustrated in FIG. 6, the translation of the image sensors 472, 474, 476 of the capture system 400 may be effected at DS2 to converge the images captured by all perspectives at a subsection of the sensor's frustum height and width at a perpendicular distance from each image sensor, CD, while capturing using the full sensor's width and cropping to the resulting desired subsection of image frame, PX2. DS2 may be considered to be a maximum translation distance to overlap the two subsection frames within the full sensor resolution and may be determined by the equation, DS2=tan($D_{IA}$)*FL. PX2 may be a user defined, automatically calculated, or predefined value in pixels that represents a subsection of pixel width as captured using the full imaging sensor, and it is less than PX.

Figure 7:
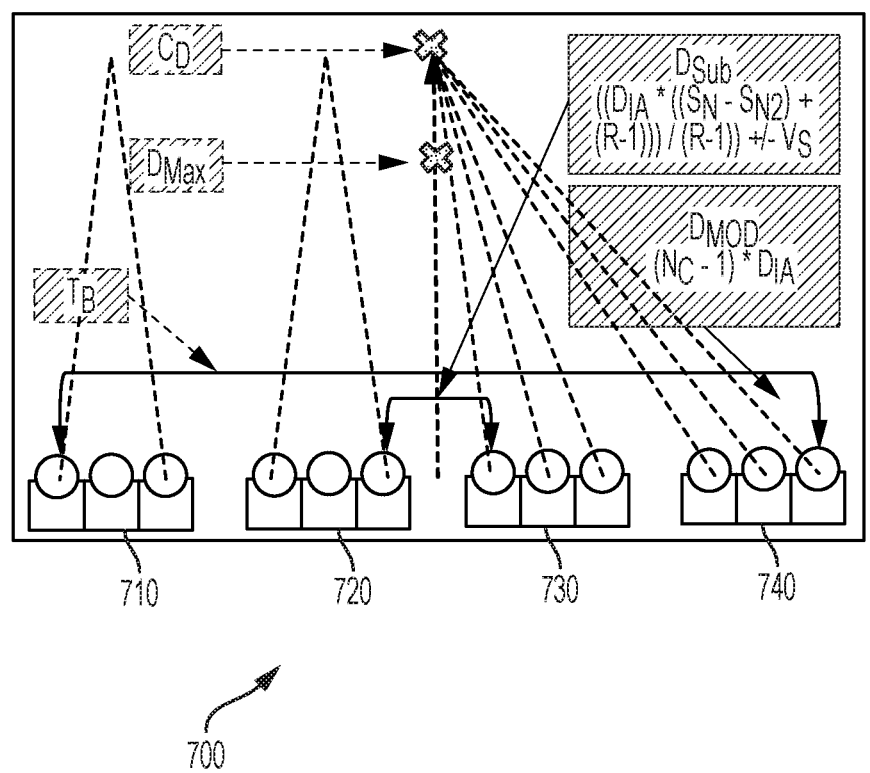
FIG. 7 is an exemplary configuration of a capture system having cluster of sensors, in accordance with the present disclosure.

FIG. 7 is a schematic diagram illustrating a capture system 700 having a first cluster of sensors 710 operable to generate first captured views, the first cluster comprising S1 number of sensors, S1 being an integer greater than one. The first cluster of sensors 710 may be similarly configured as the sensors 472, 474, 476 of the capture system 400. A first plurality of intermediate views within a first pixel disparity range, Td1, are operable to be extrapolated from the first captured views. The capture system 700 may have a second cluster of sensors 720 operable to generate the second captured views, the second cluster comprising S2 number of sensors, S2 being an integer greater than one. The second cluster of sensors 720 may be similarly configured as the sensors 472, 474, 476 of the capture system 400. A second plurality of intermediate views within a second pixel disparity range, Td2, are operable to be extrapolated from the second captured views. Each sensor of the first cluster pairs with at least one other sensor to define a maximum effective disparity, Md1, of the first cluster. Each sensor of the second cluster pair with at least one other sensor to define a maximum effective disparity, Md2, of the second cluster. In an embodiment, S1≥(Td1/Md1)+1 and S2≥(Td2/Md2)+1, and the ratios Td1/Md1 and Td2/Md2 both greater than 1. In an embodiment, at least one of the first cluster of sensors and at least one of the second cluster of sensors may be defined on different substrates. In an embodiment, the first cluster of sensors comprise at least two sensors defined on a same substrate. In an embodiment, the at least two sensors on the same substrate are operable to capture different views. In another embodiment, the first cluster of sensors comprise at least two sensors defined on different substrates. In an embodiment, at least one of the first or the second cluster of sensors comprise at least two sensors having substantially the same pixel pitch. Referring to FIG. 7, one or more individual clusters 710 and 720 may be separated by a distance per segment, DSub, where DSub=((DIA*((SN−SN2)+(R−1)))/(R−1))+/−VS.

It is to be appreciated that the limiting factors for configuring $D_{IA}$, $P_X$, $F_L$, and $S_w$ to achieve $M_D$ may include sensor module and/or electronics board width, lens outer diameter, sensor offset (for convergence or alignment), and mechanical design and other hardware considerations. This limiting factor can be expressed as the minimum distance possible between each optical module, DMin, where DMin=max(SPW+DS (or DS2), HW, LD). SPW refers to the sensor package width including all components, cables, connectors, boards and/or electronics; DS refers to the distance of maximum travel required for viewpoint convergence; HW refers to the maximum required width of the mechanical design for each individual capture module; LD refers to the lens outer diameter and includes any other optical components necessary for practical use.

Figure 8:
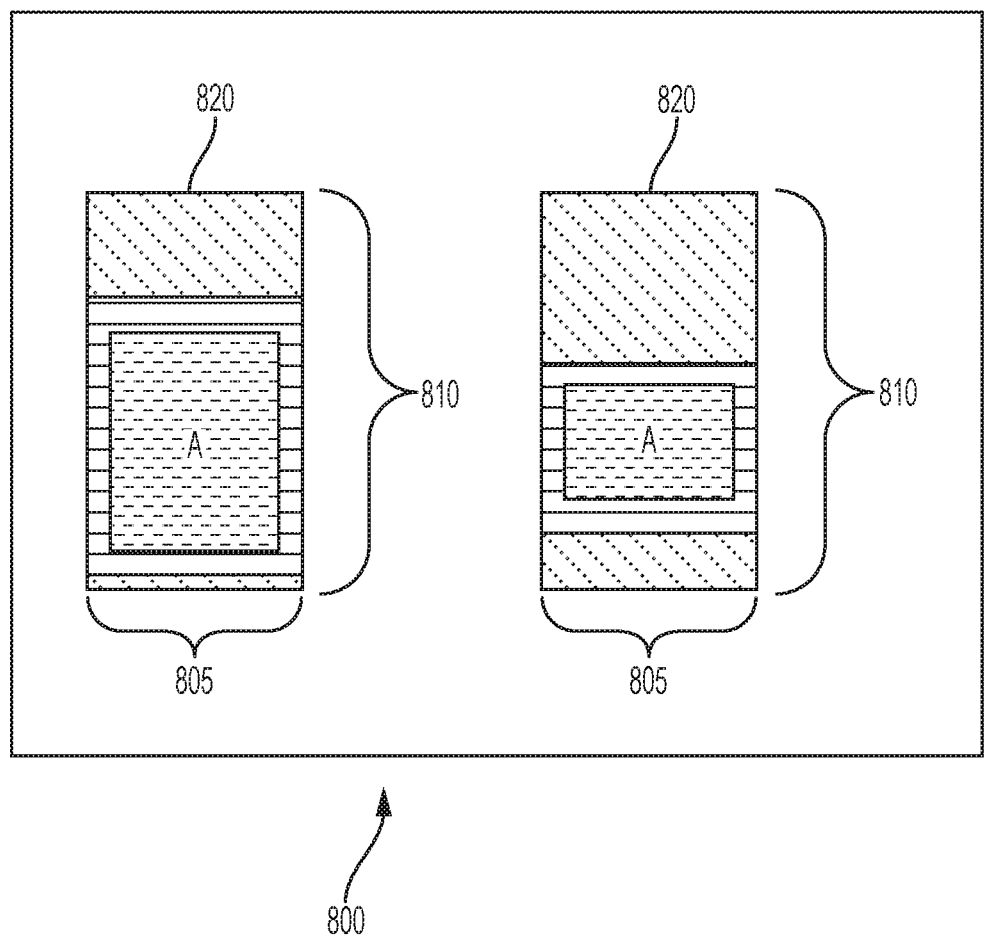
FIGS. 8 and 9 are schematic diagrams illustrating a capture system with a sensor configuration for rotated images, in accordance with the present disclosure.
Figure 9:
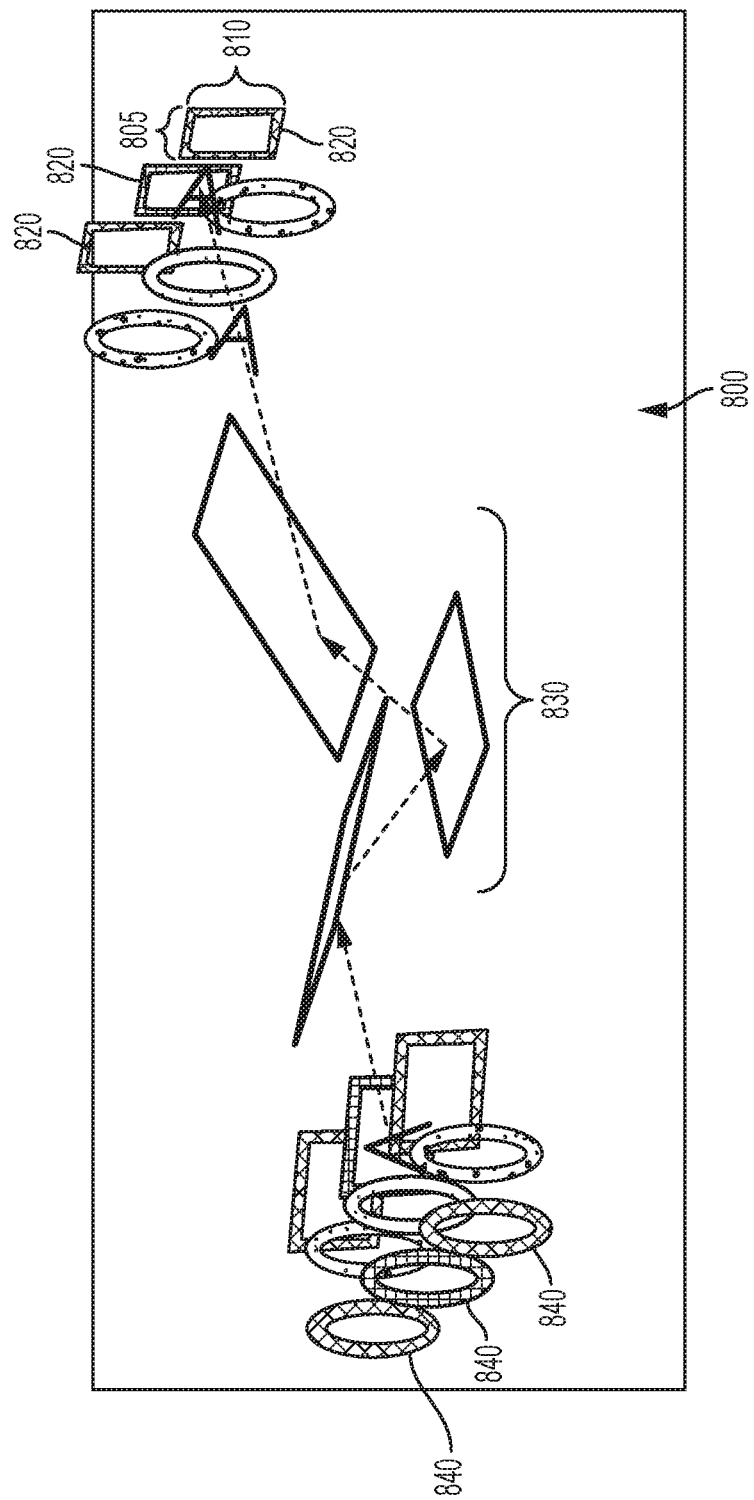

Referring to the exemplary capture system 800 as shown in FIGS. 8 and 9, to further optimize the necessary spacing and captured pixel resolution based upon the available sensor width 805, an optical rotation mechanism 830 may be introduced such that the image sensor's height 810 is now the limiting factor within the sensor board/module design 820 by optically rotating the image by +/−90 degrees. The optical rotation mechanism 830 may include the use of mirrors, relays, or prisms, external behind or in front of lens 840.

Figure 10:
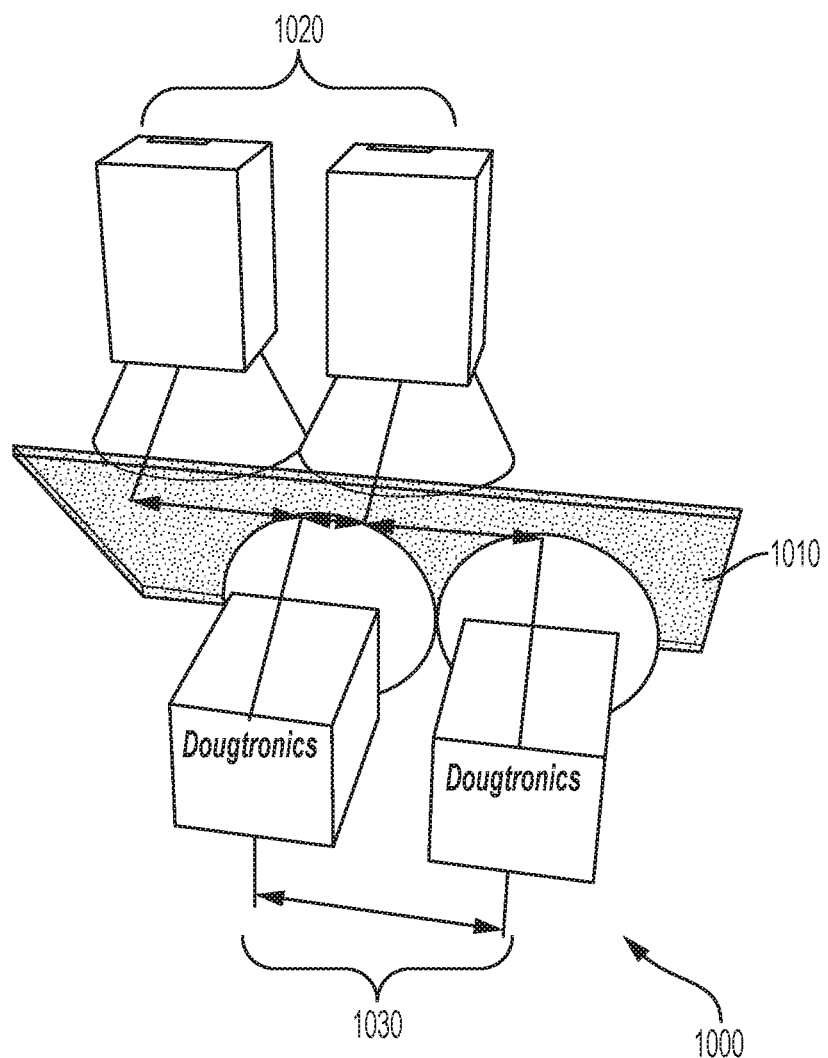
FIG. 10 is a schematic diagram illustrating a capture system with a polarizing beam splitter, in accordance with the present disclosure.

In an embodiment as shown in the capture system 1000 in FIG. 10, a beam splitter 1010 disposed between arrays 1020 and 1030 allows for an arrangement where some cameras can have an apparently closer inter-axial distance. More cameras can be added to one or both of the arrays with separations≥Md. Depending on the desired capture inter-axial spacing, it may be possible to add cameras to only one of the arrays.

Figure 11:
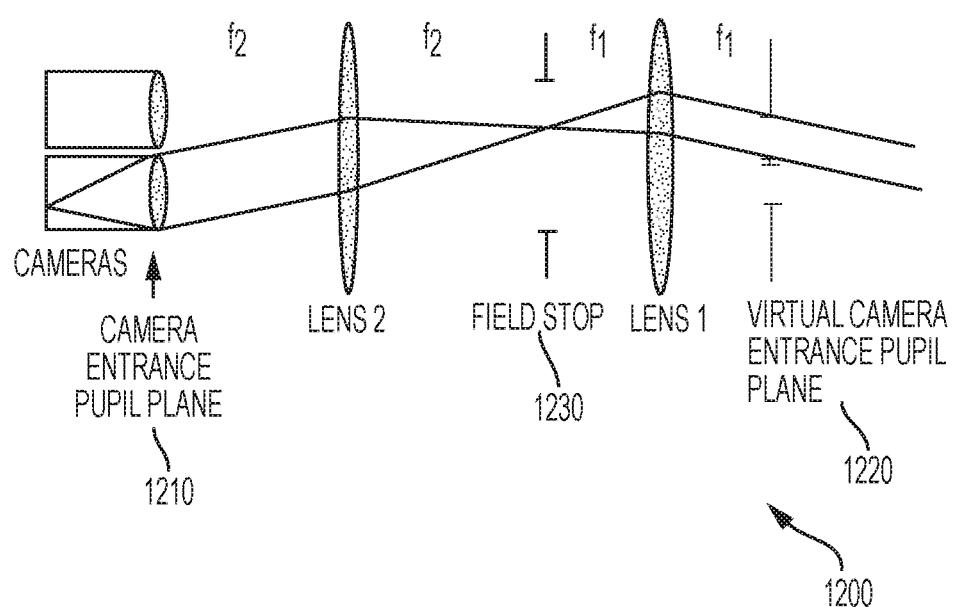
FIG. 11 is a schematic diagram illustrating exemplary elements of a capture system with a relay system, in accordance with the present disclosure.

Referring to FIG. 11, in the field of 3D image capture it may be helpful, in some circumstances, for the inter-axial separation of cameras to be reduced below what may be conveniently achieved in the construction of the camera itself. This may be achieved by using a double-telecentric relay lens system 1200 as shown in FIG. 12 to map the entrance pupils 1210 of the cameras to virtual entrance pupils 1220 with a preferred inter-axial separation. It may be convenient to focus and/or zoom the resulting compound system by making adjustments in the relay system rather than adjustments to each camera lens. The virtual pupils are, in this example, a demagnified version of the cameras' entrance pupils. The pupil diameter is demagnified by the ratio of $f_1/f_2$. Correspondingly, the field of view of the compound system is increased over the cameras' FOV by $f_2/f_1$. The field stop 1230 may not be physically present, but is useful to aid in the description. It can be arranged such that the edge of the fields of all the cameras coincide with the edge of the field stop.

FIGS. 12A and 12B illustrate an embodiment of a capture system 1300 comprising an aperture splitting configuration to allow sensors 1310, 1312, 1314, and 1316 to image a scene. The capture system 1300 may include at least one split polarizer 1320 and a PBS 1322 to cooperate to split incoming light from a camera 1330 into 4 paths to the sensors 1310, 1312, 1314, and 1316.

It should be noted that embodiments of the present disclosure may be used in a variety of optical systems and projection systems. The embodiment may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

Additionally, it should be understood that the embodiment is not limited in its application or creation to the details of the particular arrangements shown, because the embodiment is capable of other variations. Moreover, aspects of the embodiments may be set forth in different combinations and arrangements to define embodiments unique in their own right. Also, the terminology used herein is for the purpose of description and not of limitation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

i. While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically, and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A system operable to capture holographic data, the data comprising a total pixel disparity defined by the captured views, $T_D$, the system comprising:
   at least S number of optical modules comprising at least S number of respective devices configured to at least sense light and generate image data, S being an integer;
   wherein each of the at least S number of devices pair with an adjacent device to define a maximum effective disparity $M_D$;

wherein S is greater than or equal to $(T_D/M_D)+1$, the ratio $T_D/M_D$ being greater than 1; and wherein the optical modules are configured so frustums of the optical modules substantially overlap to define a convergence volume.

2. The system of claim 1, wherein the respective devices of the optical modules are configured to translate in at least a first direction by an offset distance, the first direction being perpendicular to an optical axis of the respective optical modules.

3. The system of claim 2, wherein an adjustment to the offset distance alters the frustum width of the convergence volume.

4. The system of claim 2, wherein the respective devices of the optical modules are configured to translate in a second direction, the second direction being perpendicular to the first direction.

5. The system of claim 4, wherein the respective devices of the optical modules are configured to translate in a third direction, the third direction being orthogonal to both the first and second directions.

6. The system of claim 5, wherein the second or third direction is parallel to the optical axis of the optical modules.

7. The system of claim 1, wherein the respective devices of the optical modules are positioned in a first plane and wherein the convergence volume comprises a frustum width at a perpendicular distance from the first plane.

8. The system of claim 7, wherein the perpendicular distance from the first plane is $((D_{Inf}-D_{Max})*CA\%)+D_{Max}$, wherein CA % is a percent between 0 and 100%, $D_{Max}$ is a distance between the first plane and a closest object in a scene, and $D_{inf}$ is a distance where less than 1 pixel of disparity is possible between adjacent optical modules.

9. The system of claim 1, wherein the respective devices of the optical modules are defined on a same substrate.

10. The system of claim 1, wherein the respective devices of the optical modules are defined on different substrates.

11. A system comprising:

a first cluster of optical modules configured to capture holographic data comprising a first total pixel disparity defined by the captured views, $T_{D1}$, the first cluster of optical modules comprising:

at least $S_1$ number of optical modules comprising at least $S_1$ number of respective devices configured to at least sense light and generate image data, $S_1$ being an integer;

wherein each of the at least $S_1$ number of devices pair with an adjacent device to define a maximum effective disparity $M_{D1}$;

wherein $S_1$ is greater than or equal to $(T_{D1}/M_{D1})+1$, the ratio $T_{D1}/M_{a1}$ being greater than 1; and a second cluster of optical modules configured to capture holographic data comprising a second total pixel disparity defined by the captured views, $T_{D2}$; the second cluster of optical modules comprising:

at least $S_2$ number of optical modules comprising at least $S_2$ number of respective devices configured to at least sense light and generate image data, $S_2$ being an integer;

wherein each of the at least $S_2$ number of devices pair with an adjacent device to define a maximum effective disparity $M_{D2}$;

wherein $S_2$ is greater than or equal to $(T_{D2}/M_{D2})+1$, the ratio $T_{D2}/M_{D2}$ being greater than 1.

12. The system of claim 11, wherein the respective devices of the first cluster of optical modules comprise first and second devices configured to at least sense light and generate image data, the first and second devices being defined on a same substrate.

13. The system of claim 11, wherein the respective devices of the first cluster of optical modules comprise first and second devices configured to at least sense light and generate image data, the first and second devices being defined on different substrates.

14. The system of claim 11, wherein the respective devices of the first cluster of the optical modules are configured to translate in at least a first direction by an offset distance, the first direction being perpendicular to optical axes of the respective optical modules.

15. The system of claim 14, wherein an adjustment to the offset distance alters a frustum width of a convergence volume defined by overlapping frustums of the first cluster of the optical modules.

16. The system of claim 14, wherein the respective devices of the first cluster of the optical modules are configured to translate in a second direction, the second direction being perpendicular to the first direction.

17. The system of claim 16, wherein the respective devices of the first cluster of the optical modules are configured to translate in a third direction, the third direction being orthogonal to both the first and second directions.

18. The system of claim 17, wherein the second or third direction is parallel to the optical axes of the respective optical modules.

* * * * *